US012468877B2

(12) United States Patent
Pande

(10) Patent No.: US 12,468,877 B2
(45) Date of Patent: *Nov. 11, 2025

(54) SYSTEM AND METHOD FOR IN-CONTEXT DOCUMENT COMPOSITION USING SUBJECT METADATA QUERIES

(71) Applicant: OPEN TEXT CORPORATION, Waterloo (CA)

(72) Inventor: Vaibhav Pradip Pande, Hyderabad (IN)

(73) Assignee: Open Text Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,999

(22) Filed: Jun. 26, 2023

(65) Prior Publication Data

US 2023/0334234 A1   Oct. 19, 2023

Related U.S. Application Data

(63) Continuation of application No. 17/465,318, filed on Sep. 2, 2021, now Pat. No. 11,734,500, which is a continuation of application No. 17/227,125, filed on Apr. 9, 2021, now Pat. No. 11,741,297, which is a continuation of application No. 16/455,432, filed on Jun. 27, 2019, now Pat. No. 11,003,840.

(51) Int. Cl.
| | |
|---|---|
| *G06F 40/166* | (2020.01) |
| *G06F 40/211* | (2020.01) |
| *G06V 30/412* | (2022.01) |
| *G06V 30/416* | (2022.01) |

(52) U.S. Cl.
CPC .......... *G06F 40/166* (2020.01); *G06F 40/211* (2020.01); *G06V 30/412* (2022.01); *G06V 30/416* (2022.01)

(58) Field of Classification Search
CPC .... G06F 40/186; G06F 40/211; G06F 40/166; G06F 16/93; G06F 40/131; G06V 30/412; G06V 30/416
See application file for complete search history.

(56) References Cited

U.S. PATENT DOCUMENTS

| | | | |
|---|---|---|---|
| 6,192,362 B1 * | 2/2001 | Schneck | H04L 61/4523 707/999.009 |
| 6,349,307 B1 * | 2/2002 | Chen | G06F 16/355 707/999.005 |

(Continued)

OTHER PUBLICATIONS

Office Action for U.S. Appl. No. 18/306,712, issued by the U.S. Patent and Trademark Office, mailed Nov. 19, 2023, 55 pgs.

(Continued)

*Primary Examiner* — Wilson W Tsui
(74) *Attorney, Agent, or Firm* — Sprinkle IP Law Group

(57) ABSTRACT

Embodiments of systems and method for assistance in document composition in the context of a document editor are disclosed. Specifically, embodiments may utilize a document definition syntax that allows a user to define a document that includes a set of document sections with identifiers and definitions. A client document compositor may be integrated with the document editor and communicate with a document composition platform to obtain a data section for substitution in the document in place of a document section.

18 Claims, 9 Drawing Sheets

(56) References Cited

U.S. PATENT DOCUMENTS

| | | | |
|---|---|---|---|
| 7,512,601 | B2 | 3/2009 | Cucerzan |
| 9,262,420 | B1 | 2/2016 | Schoeffler |
| 10,402,061 | B2* | 9/2019 | Kohlmeier ............ G06F 3/0482 |
| 10,565,296 | B2 | 2/2020 | Verlaan |
| 11,720,758 | B2 | 8/2023 | Hutchins |
| 11,914,666 | B2 | 2/2024 | Parmiter |
| 12,026,188 | B2 | 7/2024 | Narth |
| 12,032,648 | B2 | 7/2024 | Narth |
| 12,032,808 | B2 | 7/2024 | Govind |
| 12,039,284 | B2 | 7/2024 | Hutchins |
| 2002/0052730 | A1 | 5/2002 | Nakao |
| 2002/0099685 | A1* | 7/2002 | Takano .................. G06F 16/93 |
| 2005/0154702 | A1 | 7/2005 | Liu |
| 2007/0282826 | A1 | 12/2007 | Hoeber |
| 2008/0288861 | A1* | 11/2008 | Jones .................... G06F 40/106 |
| | | | 715/253 |
| 2009/0019362 | A1* | 1/2009 | Shprigel ............... G06F 16/374 |
| | | | 715/256 |
| 2010/0107053 | A1 | 4/2010 | Kanzaki |
| 2013/0159840 | A1* | 6/2013 | Nicolaescu ........... G06F 40/186 |
| | | | 715/235 |
| 2013/0268850 | A1* | 10/2013 | Kyprianou ............ G06F 40/166 |
| | | | 715/255 |
| 2013/0326345 | A1 | 12/2013 | Haggart |
| 2014/0317104 | A1 | 10/2014 | Isaacs |
| 2015/0121184 | A1* | 4/2015 | Steinmann ............ G06F 3/1257 |
| | | | 715/205 |
| 2015/0220491 | A1* | 8/2015 | Cochrane ............. G06F 40/106 |
| | | | 715/209 |
| 2015/0302076 | A1 | 10/2015 | Kim |
| 2016/0055134 | A1 | 2/2016 | Sathish |
| 2016/0063016 | A1 | 3/2016 | Eggleston |
| 2017/0185573 | A1 | 6/2017 | Milvaney |
| 2018/0260475 | A1 | 9/2018 | Zhang |
| 2019/0042551 | A1 | 2/2019 | Hwang |
| 2019/0052939 | A1 | 2/2019 | Wang |
| 2019/0228059 | A1 | 7/2019 | Florentin |
| 2022/0215052 | A1 | 7/2022 | Chalana |
| 2022/0343442 | A1 | 10/2022 | Graham |
| 2023/0222168 | A1 | 7/2023 | Parmiter |
| 2023/0244744 | A1 | 8/2023 | Narth |
| 2023/0266863 | A1 | 8/2023 | Govind |
| 2023/0325605 | A1 | 10/2023 | Hutchins |
| 2024/0289368 | A1 | 8/2024 | Narth |
| 2024/0370659 | A1 | 11/2024 | Hutchins |

OTHER PUBLICATIONS

Office Action for U.S. Appl. No. 18/329,432, issued by the U.S. Patent and Trademark Office, mailed Dec. 18, 2023, 15 pgs.

Notice of Allowance issued by the United States Patent and Trademark Office for U.S. Appl. No. 17/572,727, mailed Feb. 1, 2024, 13 pgs.

Notice of Allowance issued by the United States Patent and Trademark Office for U.S. Appl. No. 18/296,879, mailed Feb. 14, 2024, 17 pgs.

Notice of Allowance for U.S. Appl. No. 18/183,844, issued by the U.S. Patent and Trademark Office, mailed Oct. 24, 2023, 8 pgs.

Yang, Zi, Cai, Keke, Tang, Jie, Zhang, Li, Su, Zhong, and Li, Juanzi, "Social Context Summarization", Proceeding of the 34th Int'l ACM SIGIR Conf. on Research and Development in Information Retrieval, 2011, pp. 255-264.

Office Action for U.S. Appl. No. 18/183,844, issued by the U.S. Patent and Trademark Office, Jul. 20, 2023, 9 pgs.

Office Action for U.S. Appl. No. 17/572,727, issued by the U.S. Patent and Trademark Office, Aug. 17, 2023, 37 pgs.

Notice of Allowance issued by the United States Patent and Trademark Office for U.S. Appl. No. 18/329,432, Mar. 6, 2024, pgs.

Notice of Allowance issued by the United States Patent and Trademark Office for U.S. Appl. No. 18/306,712, Mar. 13, 2024, 2 pages.

Notice of Allowance issued by the United States Patent and Trademark Office (USPTO) for U.S. Appl. No. 17/572,727, mailed Apr. 26, 2024, 13 pages.

Notice of Allowance issued by the United States Patent and Trademark Office (USPTO) for U.S. Appl. No. 18/296,879, mailed Apr. 29, 2024, 5 pages.

Office Action for U.S. Appl. No. 18/651,424, mailed May 7, 2025, 38 pgs.

* cited by examiner

SYSTEM AND METHOD FOR IN-CONTEXT DOCUMENT COMPOSITION USING SUBJECT METADATA QUERIES

CROSS-REFERENCE TO RELATED APPLICATIONS

This application is a continuation of, and claims a benefit of priority under 35 U.S.C. 120 from, U.S. patent application Ser. No. 17/465,318, filed Sep. 2, 2021, entitled "SYSTEM AND METHOD FOR IN-CONTEXT DOCUMENT COMPOSITION USING SUBJECT METADATA QUERIES," issued as U.S. Pat. No. 11,734,500, which is a continuation of, and claims a benefit of priority under 35 U.S.C. 120 from, U.S. Patent Application Ser. No. 17/227,125, filed Apr. 9, 2021, entitled "SYSTEM AND METHOD FOR IN-CONTEXT DOCUMENT COMPOSITION USING SUBJECT METADATA QUERIES," issued as U.S. Pat. No. 11,741,297, which is a continuation of, and claims a benefit of priority under 35 U.S.C. 120 from, U.S. patent application Ser. No. 16/455,432, filed Jun. 27, 2019, entitled "SYSTEM AND METHOD FOR IN-CONTEXT DOCUMENT COMPOSITION USING SUBJECT METADATA QUERIES," issued as U.S. Pat. No. 11,003,840, all of which are fully incorporated by reference herein for all purposes.

TECHNICAL FIELD

This disclosure relates generally to electronic documents. Even more specifically, this disclosure relates to the composition of electronic documents and providing assistance in the composition of such electronic documents. Even more specifically, this disclosure relates to providing an in-context capability for the automated and rapid composition of electronic documents.

BACKGROUND

Currently the composition of electronic documents (or just documents) is a manually intensive task for users of computing systems. In most cases, a user must open a document editing or composition application (collectively document editor) and manually create the data of the document (e.g., the text, images or other content of the document, which may be collectively referred to herein as text, data or content of the document without loss of generality). While this content may be manually gathered from a variety of sources, including sources which may be online or otherwise electronically available, it still falls to the user to manually gather desired data from across the different sources, including discovery and location of such data, culling, vetting and editing of such data and incorporation of disparate types of content into the document.

Electronic document composition is thus a time consuming and manual process. The user must leave the context of the document editor in which the user is working to research and attempt to locate content for inclusion into the document being authored. Moreover, it may even require a certain degree of initial knowledge about where to locate certain types of data in instances where a user is not creating the content from scratch. Thus, the quality of the document may be at least somewhat dependent on the user's a priori knowledge of data sources from which content may be obtained or the user's skill in locating such content (e.g., in constructing searches or the like).

While certain document editors have the ability to provide automated in-context assistance in correcting content that has been added to a document by a user, such assistance does not extend to the location, selection or inclusion of the content itself.

What is desired therefore, are systems and methods for providing in-context support and assistance for document authoring in a document editor.

SUMMARY

To those ends, among others, embodiments as disclosed herein may provide systems and method for assistance in document composition in the context of a document editor. Specifically, embodiments may utilize a document definition syntax that allows a user to define a document that includes a set of document sections with associated identifiers and associated metadata definitions. A metadata definition may be, for instance, a text string, an image or both. In particular, the syntax for a metadata document section may be defined as having a portion including a token identifying the document section as a metadata section, a portion including an identifier for the section (e.g., a alphanumerical identifier) and a portion including the metadata definition itself (e.g., the text string or image).

The document definition syntax may also allow the definition of a document section for a subject with an associated identifier and a subject definition. Again, the subject definition may be, for example, a text string, an image or both. In particular, the syntax for a subject document section may be defined as having a portion including a token identifying the document section as a subject section, a portion including an identifier for the section (e.g., an alphanumerical identifier) and a portion including the subject definition itself (e.g., the text string or image).

In such cases where both subject and metadata are defined for a document, the identifiers for the metadata definition may allow each metadata document section to be associated with a corresponding subject document section. Moreover, such identifiers may specify an order such that both the associated subject definitions and metadata definitions may be ordered according to their identifiers.

For each metadata document section defined in the document definition a request can be submitted to a data analytics or summarization engine (e.g., collectively data analytics platform or engine) such as OpenText's Magellan through a corresponding interface offered by the data analytics platform. Such a request may include the metadata definition (e.g., the text or image of the metadata definition) of the metadata document section. A set of data sections (e.g., text, images or both) may be received from the data analytics engine and presented to the user of the document editor. The user may then select a data section from the set of data sections for incorporation into the document. The selected data section is then substituted in the document in place of the metadata document section.

The query and selection process can be repeated for each of the metadata document sections of the document to replace each of the metadata document sections with a corresponding data section selected by the user from data sections for that metadata document section returned from the data analytics engine in response to a query including the metadata definition from that section.

Moreover, in some embodiments a similar technique may be utilized to obtain paragraph headers for the subject document sections. Here, the subject definitions of each subject definition section may be utilized to query the data analytics system to return a set of header sections. The set of header sections may be received from the data analytics engine and presented to the user of the document editor. The user may then select a header section from the set of header sections for incorporation into the document. The selected header section is then substituted in the document in place of the subject document section.

Accordingly, embodiments may allow composition of entire documents without any manual authoring by a user with an added benefit that a user can access and add the rich data from digital world to the document being composed. Moreover, document composition becomes very fast, in certain cases authoring a few page document may only take a few minutes. This capability can reduce time for document composition drastically which can be significant for large (or other types of) organizations.

Accordingly, embodiments may allow composition of entire documents without any manual authoring by a user with an added benefit that a user can access and add the rich data from digital world to the document being composed. Moreover, document composition becomes very fast, in certain cases authoring a few pages document may only take a few minutes. This capability can reduce time for document composition drastically which can be significant for large (or other types of) organizations.

Embodiments of such document composition assistants or client document compositors (terms used interchangeably herein) may be integrated directly into document editors or be implemented, for example, as a plug-in to an existing document editor or web browser, or as a downloaded script or other type of instructions that can be accessed in association with a document editor, such as a browser based document editor or the like. Certain embodiments may provide, for example, a client side compositor application that may be integrated with a document editor. Such a client side application may be integrated with a document editor at build time, such that the document editor includes the client side application and the document editor and client side application may be distributed and installed together.

As another method of deployment, the client side document editor application may be integrated with the document editor at run-time, as for example, as a plug-in to the document editor so it may installed or un-installed by a user or information technology department as needed. As another example of a run-time deployment, in cases where the document editor is web or browser based, the client side document editor application may be a script or other type of component (e.g., JavaScript widget or the like) that can be downloaded and executed by the browser.

As another method of deployment, the client side document editor application may be integrated with the document editor at run-time, as for example, as a plug-in to the document editor so it may be installed or un-installed by a user or information technology department as needed. As another example of a run-time deployment, in cases where the document editor is web or browser based, the client side document editor application may be a script or other type of component (e.g., JavaScript widget or the like) that can be downloaded and executed by the browser.

When a request is received from a document composition assistant (e.g., a metadata request with a metadata definition) the request may be queued by the document composition server. When the request is processed by the document composition server, the document compositor may form a request with the metadata definition according to an interface utilized by the data analytics engine or engines being used and send the request to the data analytics engine. The data sections returned from the data analytics engine to the document compositor can then be returned to the requesting document composition assistant to be presented to the user for selection.

Embodiments of this type of architecture may allow the extensibility and use of such document composition assistants with a wide variety of document editors. The document composition assistants may be installed or uninstalled as needed by a user or organization. The implementation of the document composition web services provides a stable interface for use by many clients (e.g., instances of document composition assistants) even in instances where such clients are affiliated with different users or organizations. As another benefit, the use of a web service for servicing requests from the document composition assistants allows the use of different or multiple data analytics engines by the web service without alteration to the document composition assistants or other clients which may utilize the document composition web service.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1A:
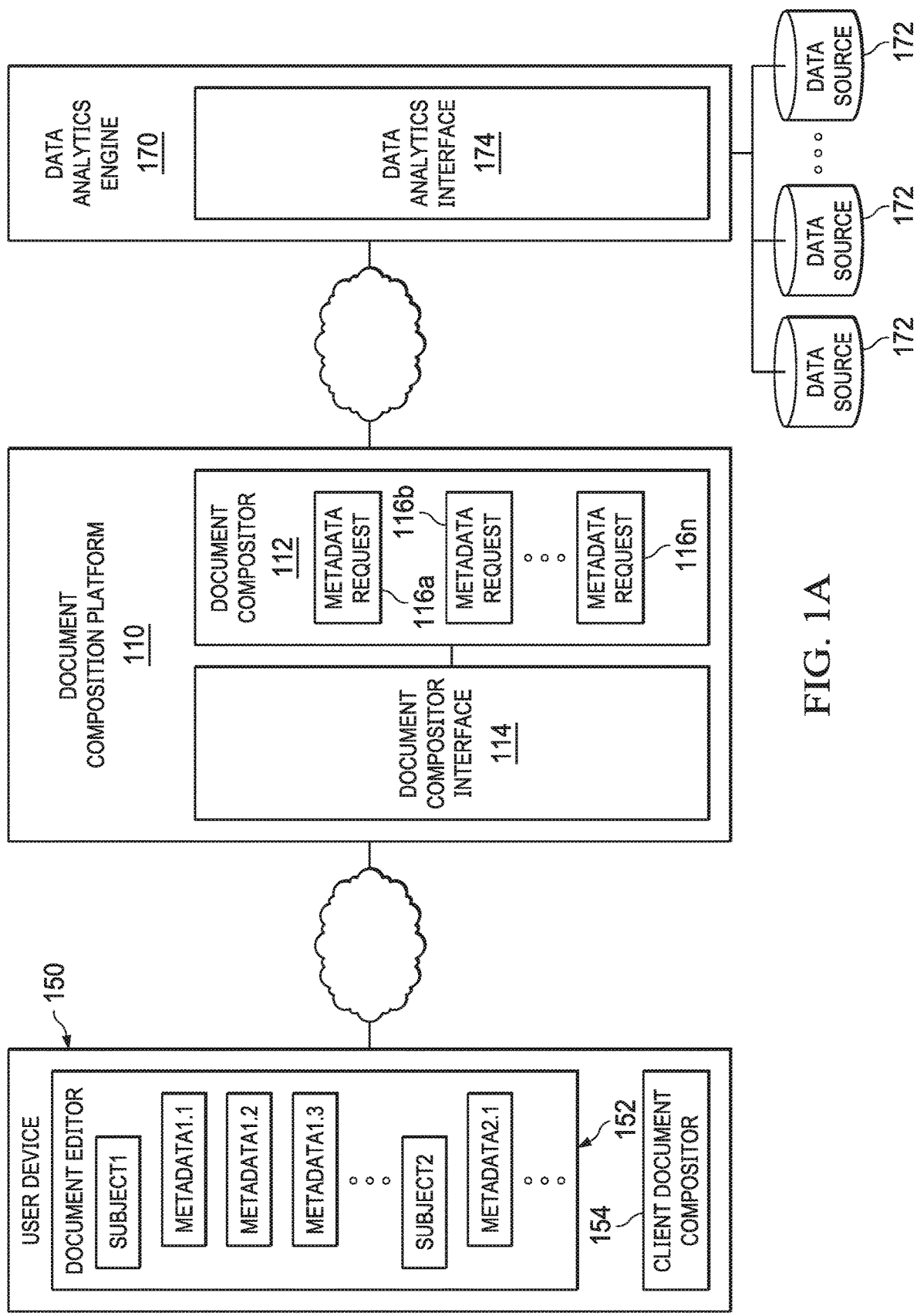
FIGS. 1A-1H are diagrammatic representations of a computing architecture including an embodiment of a document composition system.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before delving into embodiments in more detail, some brief context may be useful. As discussed, the composition of documents is currently a manually intensive task for users of computing systems. In most cases, a user must open a document editing or composition application and manually create the data of the document. While this content may be manually gathered from a variety of sources, including sources which may be online or otherwise electronically available, it still falls to the user to manually gather desired data from across the different sources, including discovery and location of such data, culling, vetting and editing of such data and incorporation of disparate types of content into the document.

Electronic document composition is thus a time consuming and manual process. The user must leave the context of the document editor in which the user is working to research and attempt to locate content for inclusion into the document being authored. Moreover, it may even require a certain degree of initial knowledge about where to locate certain types of data in instances where a user is not creating the content from scratch. What is desired therefore, are systems and methods for providing in-context support and assistance for document authoring in a document editor.

To those ends, among others, embodiments as disclosed herein may provide systems and method for assistance in document composition in the context of a document editor. Specifically, in certain embodiments, a client side document compositor may be integrated with a document editor to provide in-context document composition assistance through the use of a document definition syntax that allows a user to define a set of document sections with associated identifiers and associated metadata definitions. A metadata definition may be, for instance, a text string, an image or both. The document definition syntax may also allow the definition of a document section for a subject with an associated identifier and a subject definition. Again, the subject definition may be, for example, a text string, an image or both.

For each metadata document section defined in the document definition a request can be submitted to a data analytics or summarization engine. Such a request may include the metadata definition (e.g., the text or image of the metadata definition) of the metadata document section. A set of data sections (e.g., text, images or both) may be received from the data analytics engine and presented to the user of the document editor. The user may then select a data section from the set of data sections for incorporation into the document. The selected data section is then substituted in the document in place of the metadata document section.

The query and selection process can be repeated for each of the metadata document sections of the document to replace each of the metadata document sections with a corresponding data section selected by the user from data sections for that metadata document section returned from the data analytics engine in response to a query including the metadata definition from that section.

Turning to FIG. 1A then, a depiction of an embodiment of an architecture for the implementation of a document compositor system is depicted. The document compositor system may include client side document compositor 154, a document composition assistant that is integrated with a document editor 152 at a user device 150. Client side document compositor 154 may be integrated directly into document editor 152 or be implemented, for example, as a plug-in to an existing document editor 152 or web browser (e.g., when document editor 152 is a browser based document editor), or as a downloaded script or other type of instructions that can be accessed in association with a document editor 152, such as a browser based document editor or the like. Such a client side document compositor 154 may be integrated with a document editor 152 at build time, such that the document editor 152 includes the client side document compositor 154 and the document editor 152 and client side document compositor 154 may be distributed and installed together.

As another method of deployment, the client side document compositor 154 may be integrated with the document editor 152 at run-time, as for example, as a plug-in to the document editor 152 so it may be installed or un-installed by a user or information technology department as needed. As another example of a run-time deployment, in cases where the document editor 152 is web or browser based, the client side document compositor 154 may be a script or other type of component (e.g., JavaScript widget or the like) that can be downloaded and executed by the browser.

A user may define a document in document editor 152 in a document definition syntax supported or utilized by the client side document compositor 154. Embodiments of the document definition syntax allow a user to define a document that includes a set of document sections with associated identifiers and associated metadata definitions. A metadata definition may be, for instance, a text string, an image or both. In particular, the syntax for a metadata document section may be defined as having a portion including a token identifying the document section as a metadata section (e.g., @metadata), a portion including an identifier for the section (e.g., an alphanumerical identifier) (e.g., [1]) and a portion including the metadata definition itself (e.g., the text string or image) (e.g., "Importance to ecosystem"). As an example, a metadata document section may be defined as: @metadata [1]: Importance to ecosystem. Other definitions of a syntax will be possible and are fully contemplated herein.

The document definition syntax may also allow the definition of a document section for a subject with an associated identifier and a subject definition. Again, the subject definition may be, for example, a text string, an image or both. In particular, the syntax for a subject document section may be defined as having a portion including a token identifying the document section as a subject section (e.g., "@subject"), a portion including an identifier for the section (e.g., an alphanumerical identifier) (e.g., [1]) and a portion including the subject definition itself (e.g., the text string or image) (e.g., "Wildlife"). As an example, a subject document section may be defined as: @subject [1]: Wildlife. Other definitions of a syntax will be possible and are fully contemplated herein.

In such cases where both subject and metadata are defined for a document, the identifiers for the metadata definition may allow each metadata document section to be associated with a corresponding subject document section. Moreover, such identifiers may specify an order such that both the associated subject definitions and metadata definitions may be ordered according to their identifiers. So continuing with the above example for the subject "@subject [1]: Wildlife" there may be three associated metadata document sections defined: @metadata [1,1]: Importance to ecosystem, @metadata [1,2]: Forest preservation, and @metadata[1,3]: Maintain healthy food chain. Here, the first number in the identifier for the metadata document section identifies the subject for which this metadata is associated. While the second number of the identifier identifies the metadata section uniquely in the document for the associated subject.

Client side document compositor 154 may offer an interface to allow a user to evaluate the document defined by the document definition syntax or particular defined section within the defined document (e.g., particular defined document sections within the defined document. The client side document compositor 154 can then obtain the document defined according to the document definition syntax or the identified sections thereof and submit one or associated requests to a (e.g., remotely deployed) document composition platform 110.

Specifically, client side document compositor 154 may parse the document defined by the document definition syntax or particular defined section within the defined document and form one or more requests to a document composition platform according to the document compositor interface 114. It will be noted that the client side document compositor may submit a single request for each defined section or may submit a request for each section of the document, depending on the implementation. In the request, each section may be defined by the associated identifier and include the associated definition.

Here, the document composition system includes a document composition platform 110 having a document compositor interface 114, such as a Representational State Transfer (REST) interface or another type of Application Programming Interface (API), that allows these subject or metadata queries to be submitted. As mentioned, these requests may have associated identifiers and include the associated definition (e.g., text or images for the metadata or subject).

When a request is received at the document composition platform 110 the document compositor 112 may evaluate the received request and queue one or more associated requests 116 for submission to one or more data analytics engines 170 through data analytics interface 174. The document compositor 112 can thus queue and serve multiple requests from multiple clients. These data analytics engine 170 may be platforms or engines that perform data mining based on different data sources 172 and provide responses for submitted queries based on the data of the query. Examples of such data analytics engines 170 include OpenText's Magellan.

In particular, a request through document compositor interface 114 may be evaluated by document compositor 112 to determine an associated identifier for the metadata or subject document section corresponding to the request and the associated definition, and queue a corresponding request 116 for that section that includes the identifier and the associated definition. It will be noted that a received through document compositor interface 114 request may comprise requests for multiple document sections. Thus, document compositor 112 may evaluate the received request to determine the identifier and associated definition for each document section included in the request and queue a request 116 for each section including those sections respective identifier and definition.

The document compositor 112 can obtain requests 116 off of the queue and form a request to the data analytics engine 170 according to the interface provided by the data analytics interface 174. This request may include the metadata or subject definition (e.g., the text or image of the metadata or subject definition) of the metadata or subject document section as included in the request 116 queued at the document compositor.

A set of data sections (e.g., text, images or both) may be received from the data analytics engine 170 in response to the request at the document compositor 112 and returned to the requesting client side document compositor 154 through the document compositor interface 114. These data sections returned are associated with the identifier for the corresponding document section. When these data sections are received by the client side document compositor 154 they may be presented to the user of the document editor 152 in association with the corresponding document section. The user may then select a data section from the set of data sections for incorporation into the document. The selected data section is then substituted in the document in place of the (e.g., metadata) document section.

The query and selection process can thus be repeated for each of the metadata document sections of the document to replace each of the metadata document sections with a corresponding data section selected by the user from data sections for that metadata document section returned from the data analytics engines 170 in response to a query to the document composition platform 110 including the metadata definition from that section.

Figure 1B:
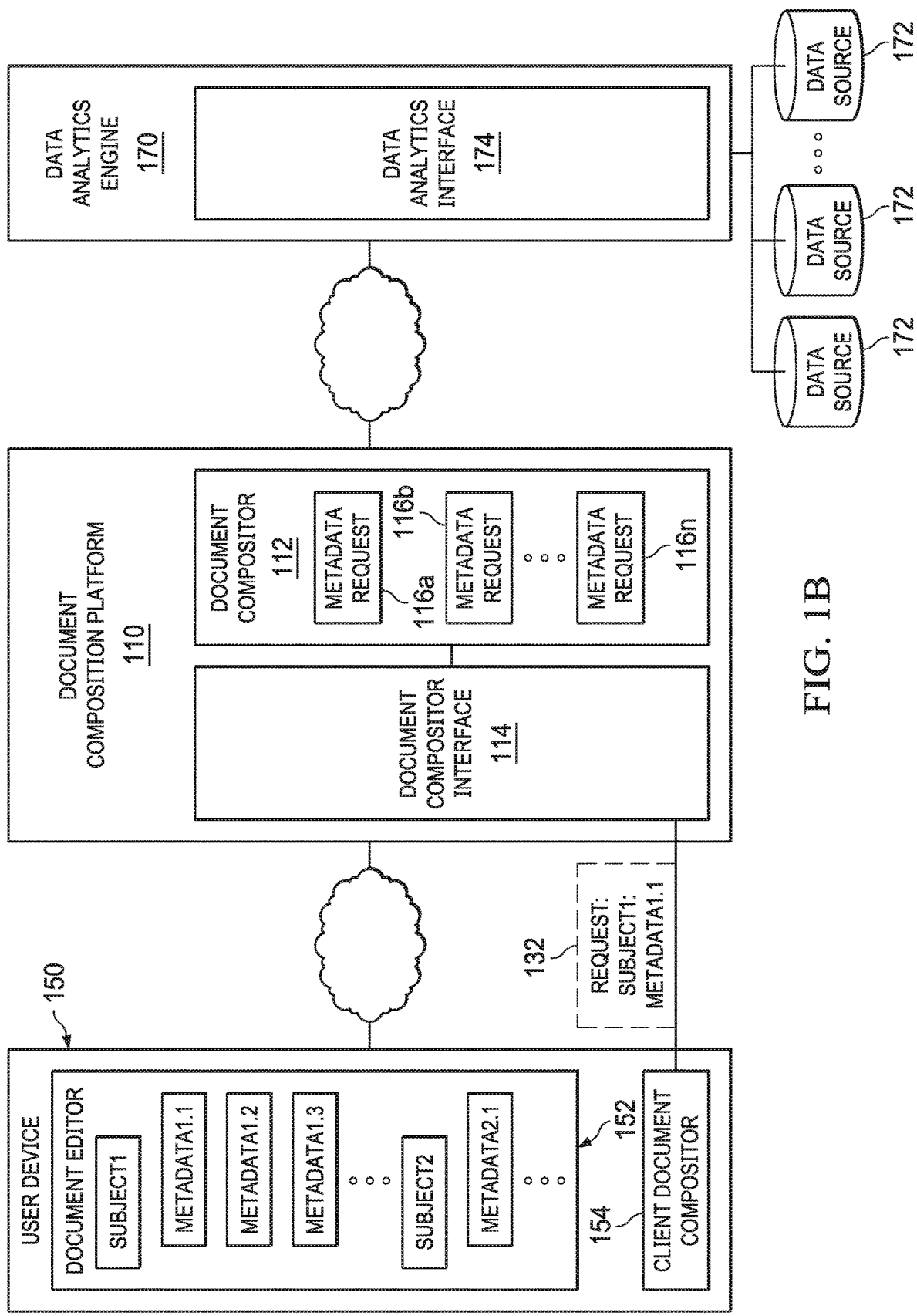

It may now be useful to illustrate the operation of the document composition system in more detail. Referring then to FIGS. 1B-1H, block diagrams depicting the functionality of one embodiment of a document composition system are depicted. As is illustrated in FIG. 1B, a user may define a document in document editor 152 in a document definition syntax supported or utilized by the client side document compositor 154. Embodiments of the document definition syntax allow a user to define a document that includes a set of document sections with associated identifiers and associated (e.g., metadata or subject) definitions.

The client side document compositor 154 may parse the defined document to identify one or more sections of the document and submit associated requests to document composition platform 110. In the illustrated example, the client side document compositor 154 has formed a request 132 for the metadata document section having identifier "1.1.". This request 132 will include the metadata definition (e.g., text or images) associated with that metadata document section (e.g., Importance to ecosystem).

Figure 1C:
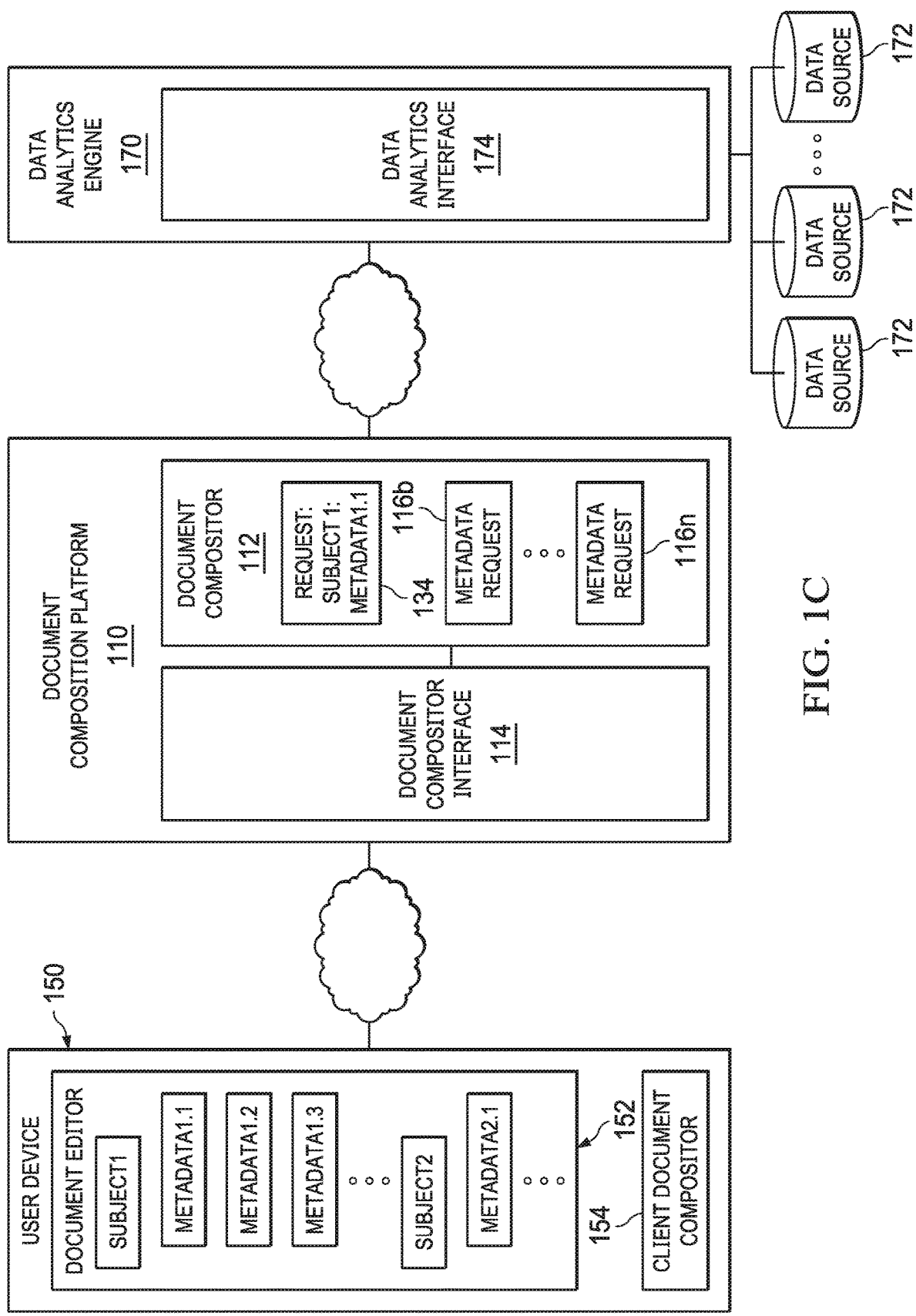

Looking at FIG. 1C, when this request 132 is received at the document composition platform 110 through the document compositor interface 114 a corresponding request 134 is queued, where the request 134 includes the identifier for the metadata document section 134 (e.g., "1.1.") and the metadata definition (e.g., text or images) associated with that metadata document section (e.g., Importance to ecosystem).

Figure 1D:
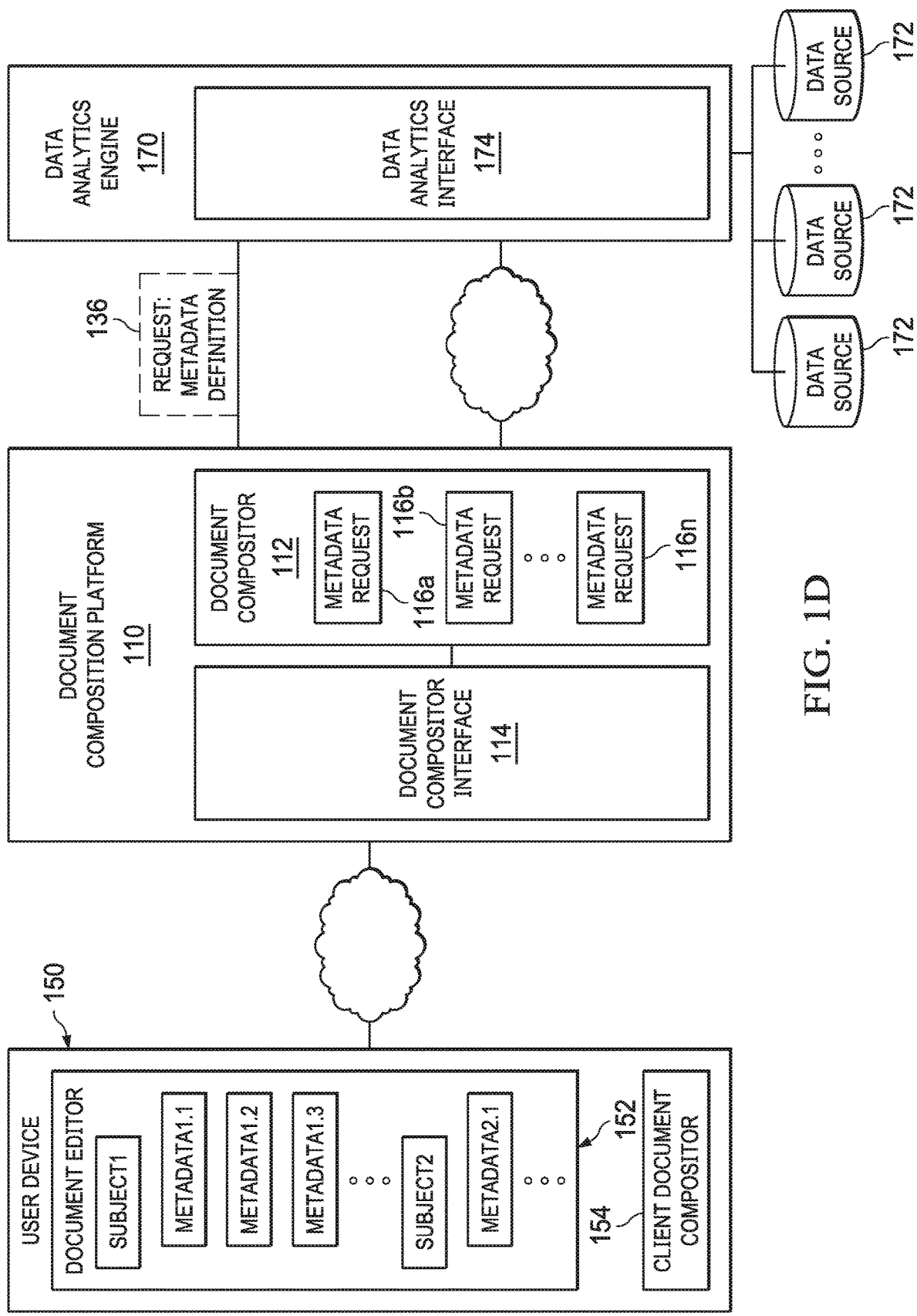

The document compositor 112 can obtain the request 134 off of the queue and form a request 136 to the data analytics engine 170 according to the interface provided by the data analytics interface 174 as depicted in FIG. 1D. This request 136 may include the metadata definition (e.g., text or images) associated with that metadata document section (e.g., Importance to ecosystem).

Figure 1E:
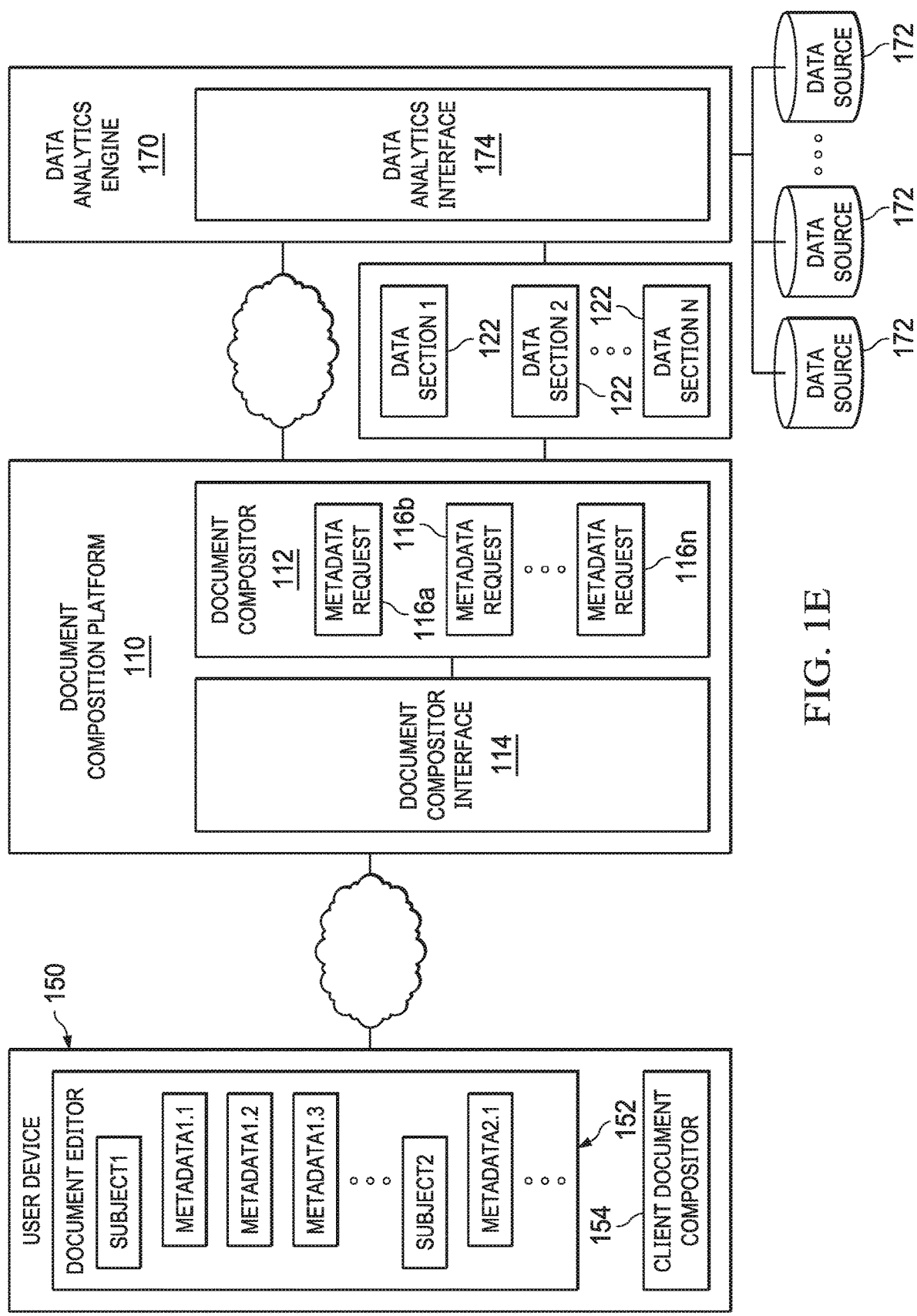
Figure 1F:
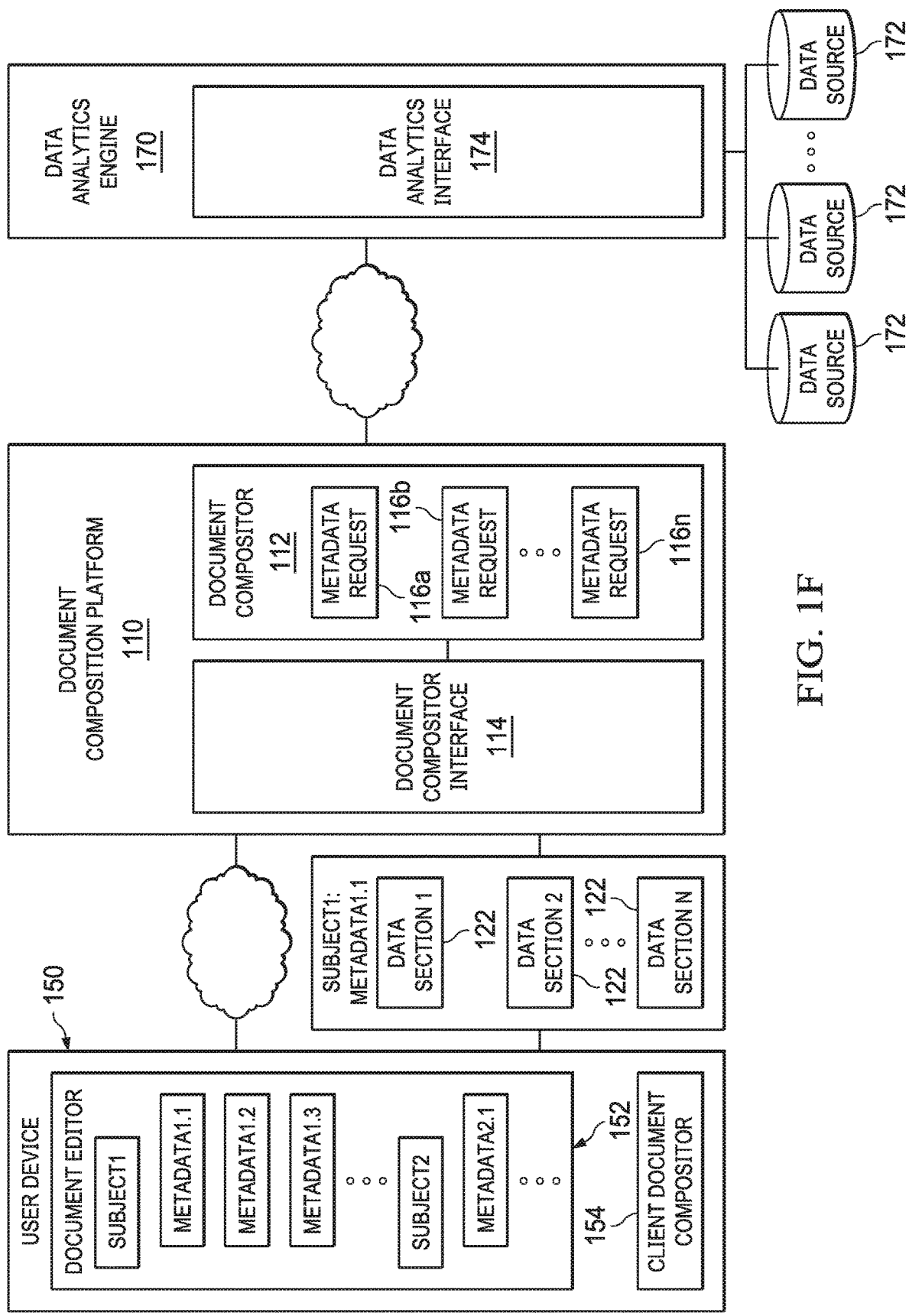

A set of data sections 122 (e.g., text, images or both) may be received from the data analytics engine 170 in response to the request at the document compositor 112 and returned to the requesting client side document compositor 154 through the document compositor interface 114 as depicted in FIGS. 1E and 1F. These data sections 122 returned are associated with the identifier for the corresponding document section (e.g., metadata section 1.1).

Figure 1G:
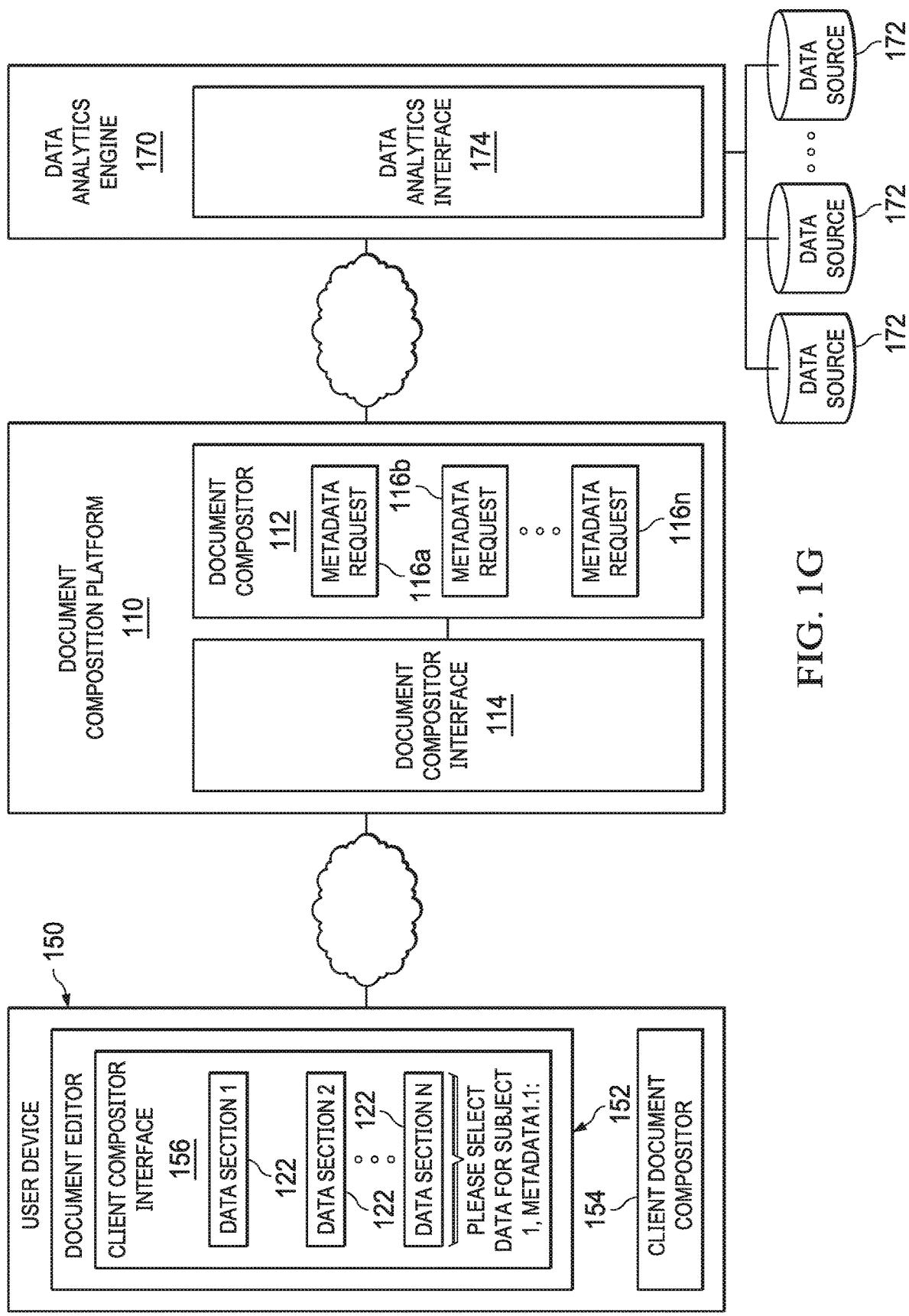
Figure 1H:
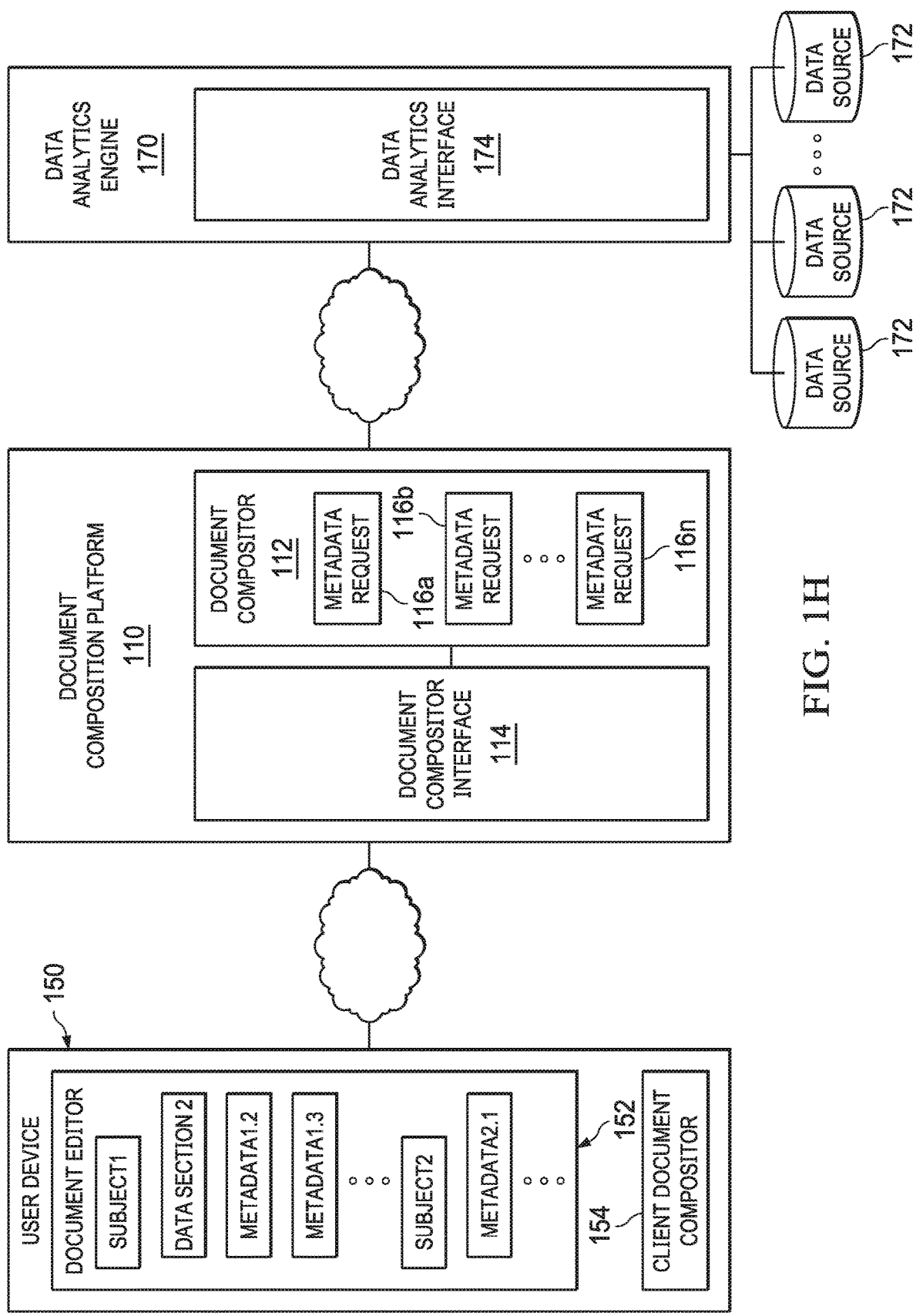

When these data sections 122 are received by the client side document compositor 154 they may be presented to the user of the document editor 152 in association with the corresponding document section (e.g., 1.1) in a client compositor interface 156 as depicted in FIG. 1G. The user may then select a data section 122 from the set of data sections 122 for incorporation into the document. The selected data section is then substituted in the document in place of the (e.g., metadata) document section, as shown in FIG. 1H where the user has selected "Data Section 2").

Figure 2:
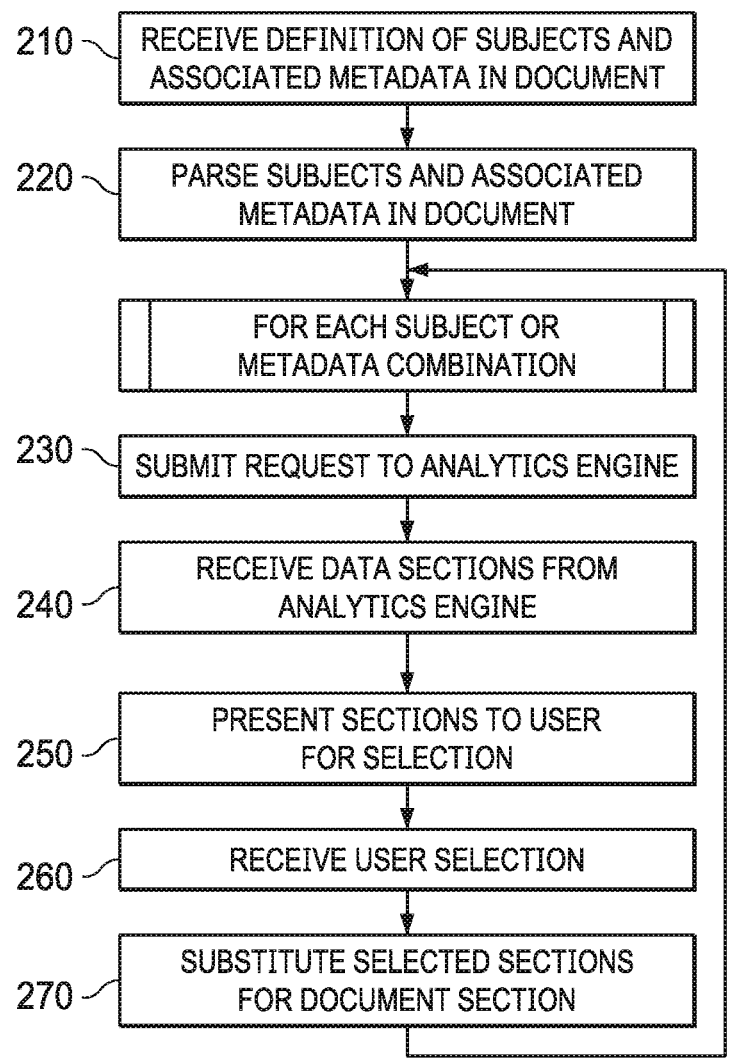
FIG. 2 is a flow diagram of one embodiment of a document composition method that may be utilized by a document composition system.

Moving now to FIG. 2, a flow diagram of one embodiment of a document composition method that may be utilized by a document composition system is depicted. Initially, a document comprising a document definition defined in a document editor may be received at the document composition system (STEP 210). This document may be defined in a document definition syntax that allows a user to define a document that includes a set of document sections. These document sections may include subject document sections or metadata document sections. Each section may have a token denoting the type of document section (e.g., subject or metadata document section), a corresponding identifier and a definition (e.g., text or image). In cases where both subject and metadata document sections are defined for a document, the identifiers for the metadata definition may allow each metadata document section to be associated with a corresponding subject document section.

When the document is received at the document composition system the document definition can be parsed to identify each document section of the document based on the token denoting the type of document sections, along with the associated identifier and definition for the document section (STEP 220). For each of the identified document sections a corresponding request for the document section can be submitted to a data analytics engine (STEP 230). The request corresponding to a document section may include the definition associated with that document section (e.g., the text or images for that document section as defined by the user).

The request to the data analytics engine may be formed differently based on the corresponding type of document section (e.g., metadata or subject). For example, for metadata document sections a request may indicate what is desired are a set of text segments or images. For subject document sections, a request may indicate what is desired are synopsis or possible subject matter headers.

In response to the request to the data analytics engine, a set of data sections may be received at the document composition system from the data analytics engine (STEP 240). These data sections may include, for example, a set of text blocks or images or both. For each identified document section of the document the corresponding set of data sections returned from the data analytics engine may be presented to a user of the document editor (STEP 250) in association with the original document. The user can select one or more of the presented data sections (STEP 260) for the corresponding document section, at which point the selected data section may be substituted in the document in the document editor in place of the corresponding document section (STEP 270).

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/FIGS. should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. Accordingly, the scope of this disclosure should be determined by the following claims and their legal equivalents.

What is claimed is:

1. A non-transitory computer readable medium, comprising instructions for:
    generating a document, the document comprising a document section, the document section including a subject definition for a subject or a metadata definition for metadata, a token identifying the document section as a subject section or a metadata section, and a unique identifier that uniquely identifies the document section in the document as being associated with the subject or the metadata;
    generating a request to a document analytics engine, the request comprising at least one of the subject definition or the metadata definition for the document section wherein the document analytics engine is adapted to generate a corresponding data section based on the at least one of the subject definition or the metadata definition for the document section;
    selecting the data section from a set of data sections, wherein a user is presented with the set of data sections in association with the unique identifier of the document section and selects the data section from the set of data sections; and
    receiving the selected data section at a document editor and substituting the received data section in place of the subject definition or the metadata definition of the document section associated with the unique identifier in the document.

2. The document editing system of claim 1, wherein the metadata definition comprises a text string or an image.

3. The document editing system of claim 2, wherein the subject definition comprises a text string or an image.

4. The document editing system of claim 3, wherein the subject for the metadata definition is a text string or an image.

5. The document editing system of claim 4, wherein the document analytics engine is selected from a plurality of analytics engines.

6. The document editing system of claim 5, wherein the document analytics engine is selected based on a category or subject of the subject definition.

7. A non-transitory computer readable medium, comprising instructions for:
    generating a document, the document comprising a document section, the document section including a subject definition for a subject or a metadata definition for metadata, a token identifying the document section as a subject section or a metadata section, and a unique identifier that uniquely identifies the document section in the document as being associated with the subject or the metadata;
    generating a request to a document analytics engine, the request comprising at least one of the subject definition or the metadata definition for the document section wherein the document analytics engine is adapted to generate a corresponding data section based on the at least one of the subject definition or the metadata definition for the document section;
    selecting the data section from a set of data sections, wherein a user is presented with the set of data sections in association with the unique identifier of the document section and selects the data section from the set of data sections; and
    receiving the selected data section at a document editor and substituting the received data section in place of the subject definition or the metadata definition of the document section associated with the unique identifier in the document.

8. The non-transitory computer readable medium of claim 7, wherein the metadata definition comprises a text string or image.

9. The non-transitory computer readable medium of claim 8, wherein the subject definition comprises a text string or image Previously Presented.

10. The non-transitory computer readable medium of claim 9, wherein the subject for the metadata definition is a text string or image Previously Presented.

11. The non-transitory computer readable medium of claim 10, wherein the document analytics engine is selected from a plurality of analytics engines.

12. The non-transitory computer readable medium of claim 11, wherein the document analytics engine is selected based on a category or subject of the subject definition.

13. A method, comprising:
    generating a document, the document comprising a document section, the document section including a subject definition for a subject or a metadata definition for metadata, a token identifying the document section as a subject section or a metadata section, and a unique identifier that uniquely identifies the document section in the document as being associated with the subject or the metadata;
    generating a request to a document analytics engine, the request comprising at least one of the subject definition or the metadata definition for the document section wherein the document analytics engine is adapted to generate a corresponding data section based on the at least one of the subject definition or the metadata definition for the document section;
    selecting the data section from a set of data sections, wherein a user is presented with the set of data sections in association with the unique identifier of the document section and selects the data section from the set of data sections; and
    receiving selected the data section at a document editor and substituting the received data section in place of the subject definition or the metadata definition of the document section associated with the unique identifier in the document.

14. The method of claim 13, wherein the metadata definition comprises a text string or image.

15. The method of claim 14, wherein the subject definition comprises a text string or image.

16. The method of claim 15, wherein the subject for the metadata definition is a text string or image category.

17. The method of claim 16, wherein the document analytics engine is selected from a plurality of analytics engines.

18. The method of claim 17, wherein the document analytics engine is selected based on a category or subject of the subject definition.

\* \* \* \* \*